United States Patent
Ellingson et al.

(10) Patent No.: US 9,448,980 B1
(45) Date of Patent: Sep. 20, 2016

(54) ORGANIZATION OWNERSHIP VERIFICATION IN A WEB APPLICATION

(71) Applicant: Google Inc., Mountain View, CA (US)

(72) Inventors: Jeffrey Gordon Ellingson, San Francisco, CA (US); Ronald Ho, Fremont, CA (US)

(73) Assignee: Google Inc., Mountain View, CA (US)

(*) Notice: Subject to any disclaimer, the term of this patent is extended or adjusted under 35 U.S.C. 154(b) by 320 days.

(21) Appl. No.: 14/066,623

(22) Filed: Oct. 29, 2013

Related U.S. Application Data (60) Provisional application No. 61/719,903, filed on Oct. 29, 2012.

(51) Int. Cl.
*G06F 17/00* (2006.01)
*G06F 17/22* (2006.01)
*G06Q 50/00* (2012.01)
*G06F 17/30* (2006.01)

(52) U.S. Cl.
CPC ..... *G06F 17/2247* (2013.01); *G06F 17/30867* (2013.01); *G06Q 50/01* (2013.01)

(58) Field of Classification Search
CPC .......................... G06Q 50/01; G06F 17/30867
USPC .................... 715/210, 739; 707/783
See application file for complete search history.

(56) References Cited

U.S. PATENT DOCUMENTS

| | | | |
|---|---|---|---|
| 8,250,097 B2* | 8/2012 | Rhodes | G06F 17/30867 707/783 |
| 8,522,147 B2* | 8/2013 | Bladel | G06Q 50/01 455/410 |
| 8,538,065 B2* | 9/2013 | Bladel | G06F 21/31 382/100 |
| 8,751,586 B2* | 6/2014 | Adelman | G06Q 10/107 709/206 |
| 2006/0047725 A1* | 3/2006 | Bramson | G06F 21/604 |
| 2009/0037470 A1* | 2/2009 | Schmidt | G06F 19/322 |
| 2014/0012908 A1* | 1/2014 | Manry | G06Q 50/01 709/204 |
| 2014/0353369 A1* | 12/2014 | Malin | G06K 19/06037 235/375 |

* cited by examiner

Primary Examiner — Mohammed-Ibrahim Zuberi
(74) Attorney, Agent, or Firm — McDermott Will & Emery LLP (57) ABSTRACT

A system and machine-implemented method for verifying ownership of an organization and providing authenticated organizational badges to be displayed is provided. A request for ownership verification is received from an organization. A first bi-directional link between a profile page for the organization and a control panel designated to the organization is established. A second bi-directional link between the profile page for the organization and a webpage of the organization is further established. An ownership of the organization is verified based on the established first and second bi-directional links. When the ownership of the organization is verified, a badge based on the profile page for the organization is provided for display in the web-based application.

14 Claims, 10 Drawing Sheets

ORGANIZATION OWNERSHIP VERIFICATION IN A WEB APPLICATION

RELATED APPLICATION

This application claims priority to U.S. provisional patent application 61/719,903, filed on Oct. 29, 2012, entitled "ORGANIZATIONAL BADGING," the contents of which are herein incorporated by reference in its entirety.

BACKGROUND

The present disclosure generally relates to providing information on a web-based application, and, in particular, to verifying ownership of an organization and providing authenticated organizational badges to be displayed on profile pages of the web-based application.

A user may broadcast organization affiliations on webpages or web-based applications. For example, a user may indicate on a social networking site or similar web-based application that he is a member of an organization, by having the organization's name (e.g., in the form of a badge) displayed in his profile or hovercard. One way for verifying membership is to send confirmation emails to an address the user has entered; however, this technique merely shows that a user had control of an email at the time of the verification process. As a result, the user may misrepresent his membership in an organization, either intentionally or inadvertently.

SUMMARY

In one innovative aspect, the disclosed subject matter can be embodied in a method. The method comprises receiving a request for ownership verification from an organization; establishing a first bi-directional link between a profile page for the organization on the web-based application and a control panel designated to the organization; establishing a second bi-directional link between the profile page for the organization and a webpage of the organization; verifying an ownership of the organization based on the established first and second bi-directional links; and when the ownership of the organization is verified providing a badge based on the profile page for the organization for display in the web-based application.

These and other embodiments can comprise one or more of the following features. Establishing the first bi-directional link between the profile page and the control panel may comprise providing, to the control panel, a link to the profile page for the organization to be entered into the control panel; receiving a token generated by the control panel based on the provided link; and establishing a link between the profile page and the control panel by entering the received token into the profile page to authenticate the profile page. Establishing the second bi-directional link between the profile page for the organization and a webpage of the organization may comprise linking the webpage of the organization to the profile page; providing a first code to be placed onto the webpage of the organization; detecting a second code from the webpage of the organization; and establishing, when the detected second code corresponds to the provided first code, a link between the profile page and the webpage of the organization. Verifying the ownership of the organization may comprise determining that the link between the profile page and the control panel, and the link between the profile page and the webpage of the organization have been established. The badge provided for display in the web-based application may include information corresponding to the profile page of the organization, and the information corresponding to the profile page of the organization may include a name of the organization. Providing the badge for display in the web-based application may further include providing the badge to members of the organization. The badge provided to the members of the organization may be displayed in at least one of a profile page of a member, an information card corresponding to the member, and a search result that returns the member as a result. The method may further comprise providing controls for administering a distribution of the provided badge. Administering the distribution of the provided badge may comprise issuing the badge to identified members of the organization, updating information corresponding to the badge, and rescinding the badge from members determined to be no longer associated with the organization.

In another innovative aspect, the disclosed subject matter can be embodied in a machine-readable medium. The machine-readable medium comprises instructions stored therein, which when executed by a system, cause the system to perform operations comprising receiving a request for ownership verification from an organization; establishing a first bi-directional link between a profile page for the organization on the web-based application and a control panel designated to the organization; establishing a second bi-directional link between the profile page for the organization and a webpage of the organization; verifying an ownership of the organization based on the established first and second bi-directional links; when the ownership of the organization is verified creating a badge for the organization, where the badge includes information corresponding to the profile page; and providing the badge for display in the web-based application.

These and other embodiments can include one or more of the following features. The instructions for establishing the first bi-directional link between the profile page and the control panel may further comprise instructions for providing, to the control panel, a link to the profile page for the organization to be entered into the control panel; receiving a token generated by the control panel based on the provided link; and establishing a link between the profile page and the control panel by entering the received token into the profile page to authenticate the profile page. The instructions for establishing the second bi-directional link between the profile page for the organization and a webpage of the organization may further comprise instructions for linking the webpage of the organization to the profile page; providing a first code to be placed onto the webpage of the organization; detecting a second code from the webpage of the organization; and establishing a link between the profile page and the webpage of the organization when the detected second code corresponds to the provided first code. Verifying the ownership of the organization may comprise determining that the link between the profile page and the control panel, and the link between the profile page and the webpage of the organization have been established. The information corresponding to the profile page may include at least one of a name of the organization, a web address corresponding to the organization, or an icon associated to the organization. The instructions for providing the badge for display in the web-based application may further comprise providing the badge to members of the organization. The badge provided to the members of the organization may be displayed in at least one of a profile page of a member, an information card corresponding to the member, or a link to the member returned in a search result. The machine-readable medium may further comprise instructions for providing controls for administering a distribution of the provided badge, wherein administering the distribution of the provided badge comprises issuing the badge to identified members of the organization, updating information corresponding to the badge, and rescinding the badge from members determined to be no longer associated with the organization.

In another innovative aspect, the disclosed subject matter can be embodied in a system. The system comprises one or more processors, and a machine-readable medium comprising instructions stored therein, which when executed by the processors, cause the processors to perform operations comprising receiving a request for ownership verification from an organization; establishing a first bi-directional link between a profile page for the organization on the web-based application and a control panel designated to the organization; establishing a second bi-directional link between the profile page for the organization and a webpage of the organization; verifying an ownership of the organization based on the established first and second bi-directional links; creating, when the ownership of the organization is verified, a badge for the organization, the badge including information corresponding to the profile page; identifying members of the organization; and providing the badge for the organization for display on user profile pages of the identified members.

These and other embodiments can include one or more of the following features. The information corresponding to the profile page includes at least one of a name of the organization, a web address corresponding to the organization, or an icon associated to the organization.

Advantageously, the subject technology verifies ownership of an organization and provides organizational badges to be displayed on social networking profiles. By having a badge displayed, a user's association with an organization may be quickly and reliably identified when the user's profile is viewed. Additionally, the presentation of the authenticated badge may provide increased user confidence in the authenticity of the information provided by the badge. The badges may also help distinguish between profiles of different user's with a same name by identifying an organization to which the user belongs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The disclosed subject matter provides for verifying an organization affiliation on a web-based application. Once the organization affiliation is verified, an organizational badge may be provided to be displayed on profiles of users that associated with the organization. When a request for ownership verification from an organization is received, a first bi-directional link between a profile page for the organization on the web-based application and a control panel designated to the organization is established. A second bi-directional link between the profile page for the organization and a webpage of the organization is also established. An ownership of the organization is verified based on the established first and second bi-directional links. Once the ownership is verified, a badge based on the profile page for the organization is provided for display in the web-based application.

Figure 1:
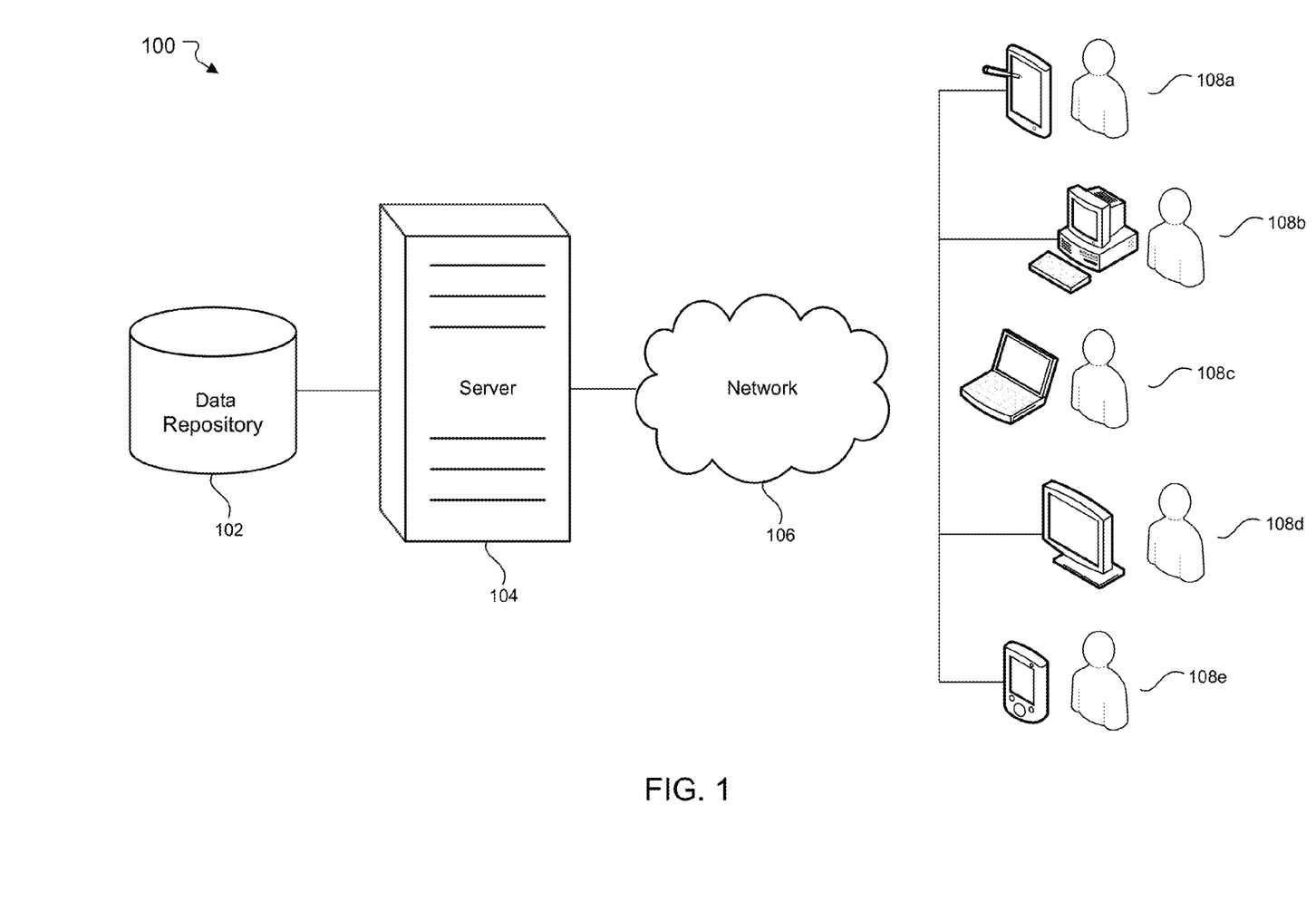
FIG. 1 illustrates an example network environment which provides for verifying ownership of an organization on a web-based application.

FIG. 1 illustrates an example network environment which provides for verifying ownership of an organization on a web-based application. Network environment 100 includes a data repository 102 (e.g., computer-readable storage media) for storing a variety of data accessed by web-based applications. For example, data related to profile pages of a web-based social networking application may be stored to and retrieved from data repository 102 by server 104. Data repository 102 may store images and information related to the different users and organizations of the web-based application. While the network environment 100 includes a single data repository 102 in FIG. 1, the network environment may include additional data repositories in some implementations.

Network environment 100 further includes server 104. While network environment 100 includes a single server in FIG. 1, network environment 100 may include several interconnected servers in some implementations. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from data repository 102 and serve the set of data to client devices 108a-108e.

Each of client devices 108a-108e represents various forms of processing devices. Examples of a processing device include a desktop computer, a laptop computer, a handheld computer, a television coupled to a processor or having a processor embedded therein, a personal digital assistant (PDA), a network appliance, a camera, a smart phone, a media player, a navigation device, an email device, a game console, or a combination of any these data processing devices or other data processing devices.

Each of client devices 108a-108e may be any system or device having a processor, a memory, and communications capability for providing content to the electronic devices. In some example aspects, server 104 can be a single computing device, for example, a computer server. In other embodiments, server 104 can represent more than one computing device working together to perform the actions of a server computer (e.g., cloud computing). Further, each of client devices 108a-108e can represent various forms of servers including, but not limited to a web server, an application server, a proxy server, a network server, or a server farm.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

In example aspects, server 104 may receive a request for verifying ownership of an organization presented on a web-based application. Upon receipt of this request, server 104 may establish bi-directional links between a profile page for the organization on the web-based application and a control panel designated to the organization, and between the profile page for the organization and a webpage of the organization. Server 104 may verify an ownership of the organization based on the established first and second bi-directional links, and provide a badge based on the profile page for the organization for display in the web-based application when the ownership is verified.

Figure 2:
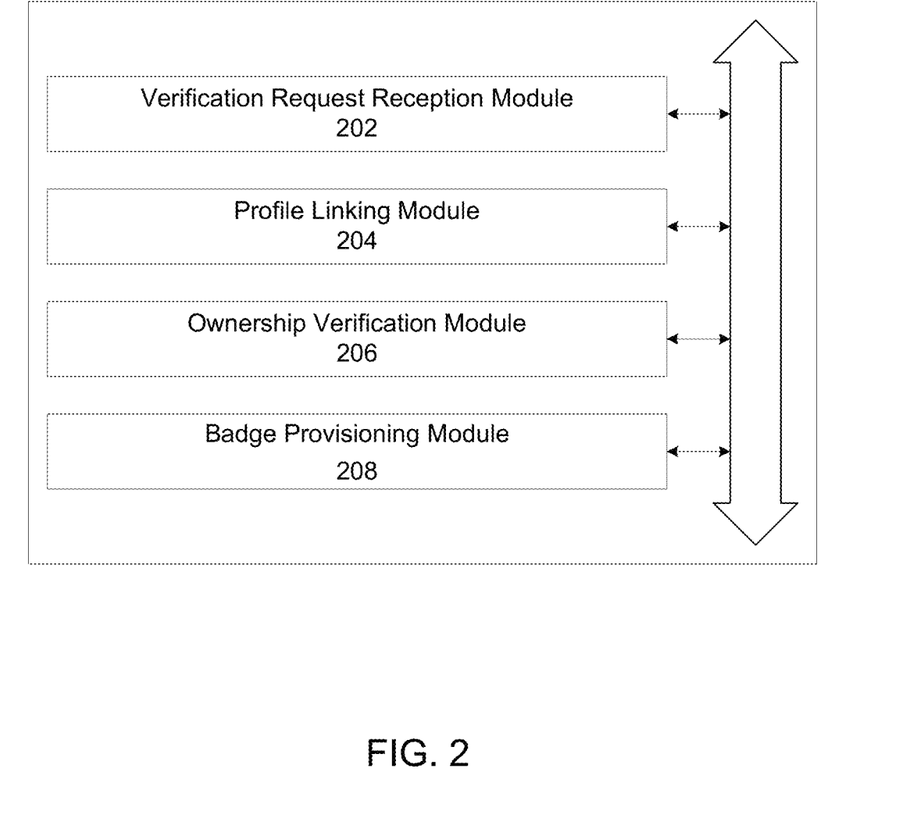
FIG. 2 illustrates an example of a server system for verifying ownership of an organization on a web-based application.

FIG. 2 illustrates an example of a system for verifying ownership of an organization on a web-based application. System 200 includes verification request reception module 202, profile linking module 204, ownership verification module 206, and badge provisioning module 208. These modules, which are in communication with one another, process information retrieved from data repository 102 in order to verify an ownership of an organization on the web-based application. For example, when a verification request is made by an organization, the request is received by the verification request reception module 202. Once the request is received, profile linking module 204 establishes a first bi-directional link between a profile page for the organization on the web-based application and a control panel designated to the organization. The control panel provides for managing the organization profile page as well as the distribution the badge to the appropriate user profiles via inputs received from a designated administrator account of the organization. The control panel further provides for defining categories and sub-categories within the organization.

Profile linking module 204 also establishes a second bi-directional link between the profile page and a webpage of the organization. The link between the profile page and the webpage of the organization is established by sending code (e.g., a snippet of code) to be placed onto the webpage of the organization. When the code is paced on a webpage, the code may be detectable. Ownership of the organization may be verified based on the established first and second bi-directional links by ownership verification module 206. Once ownership is established, badge provisioning module 208 may provide a badge that represents the organization to user profiles and other associated profile pages that are identified as being part of the organization.

In some aspects, the modules may be implemented in software (e.g., subroutines and code). The software implementation of the modules may operate on server 104. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
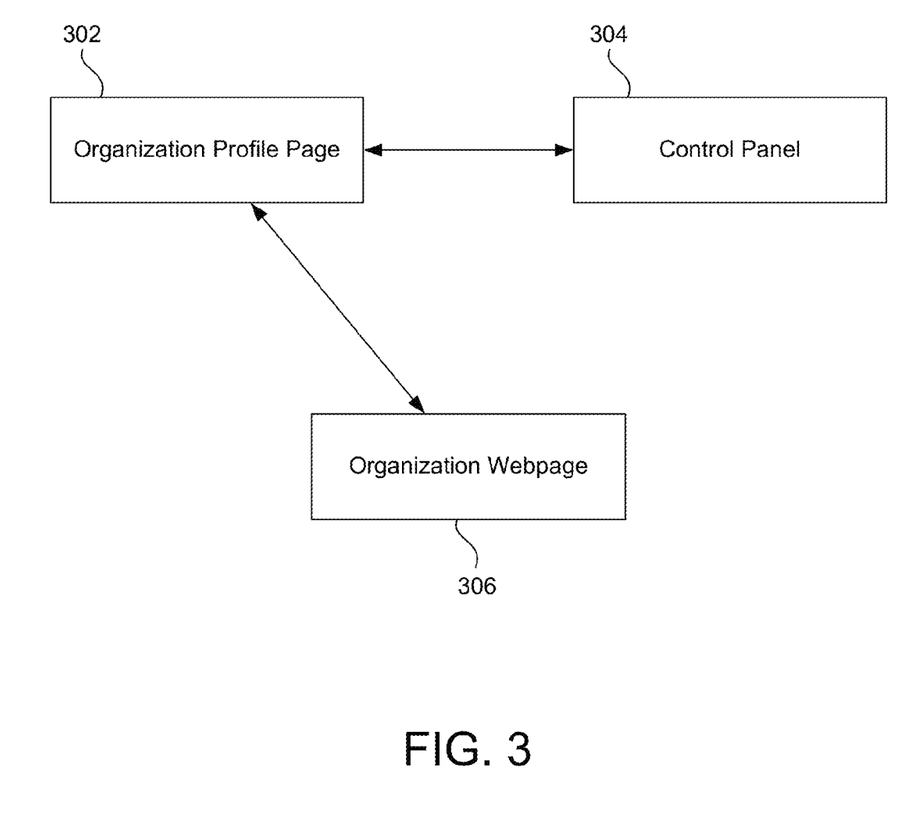
FIG. 3 provides a graphical representation of example components for verifying ownership of an organization on a web-based application.

FIG. 3 provides a graphical representation of example components for verifying ownership of an organization on a web-based application. As discussed above, organization profile page 302 is bi-directionally linked to control panel 304 and organization webpage 306. For example, a link of organization profile page 302 may be placed into control panel 304. When the link from organization profile page 302 is provided to control panel 304, a token is generated. The token generated by control panel 304 may then be entered into organization profile page 302 to verify that organization profile page 302 is connected to control panel 304, thus completing the bi-directional link.

Organization profile page 302 may also be bi-directionally linked to organization webpage 306. A link to organization webpage 306 may be established within organization profile page 302. In order to indicate ownership of the webpage, code is provided for being placed into organization webpage 306. The bi-directional link is established when the code is placed into organization webpage 306, and subsequently detected from the webpage, thereby proving ownership of the webpage. Once ownership of organization webpage 306 has been established, the name of organization profile page 302 may be used as the name of the badge to be displayed on approved profiles.

In some aspects, the administration of badges may be accomplished via the control panel 304. For example, an employee of an organization may submit a request to place the organization's badge on the employee's profile page to indicate employment by the organization. The request may be provided to the control panel, at which an administrator of the organization may grant or deny the request. When the request is granted, the organization's badge may be provided for display, for example, on the employee's profile page, on the employee's information card, etc. In some implementations, the badge may also appear as part of a search query for which the employee is returned as a result. The control panel may also provide the administrator the authority to revoke badges. For example, if an employee leaves the employ of the organization, the administrator may revoke the badge from being displayed.

Figure 4:
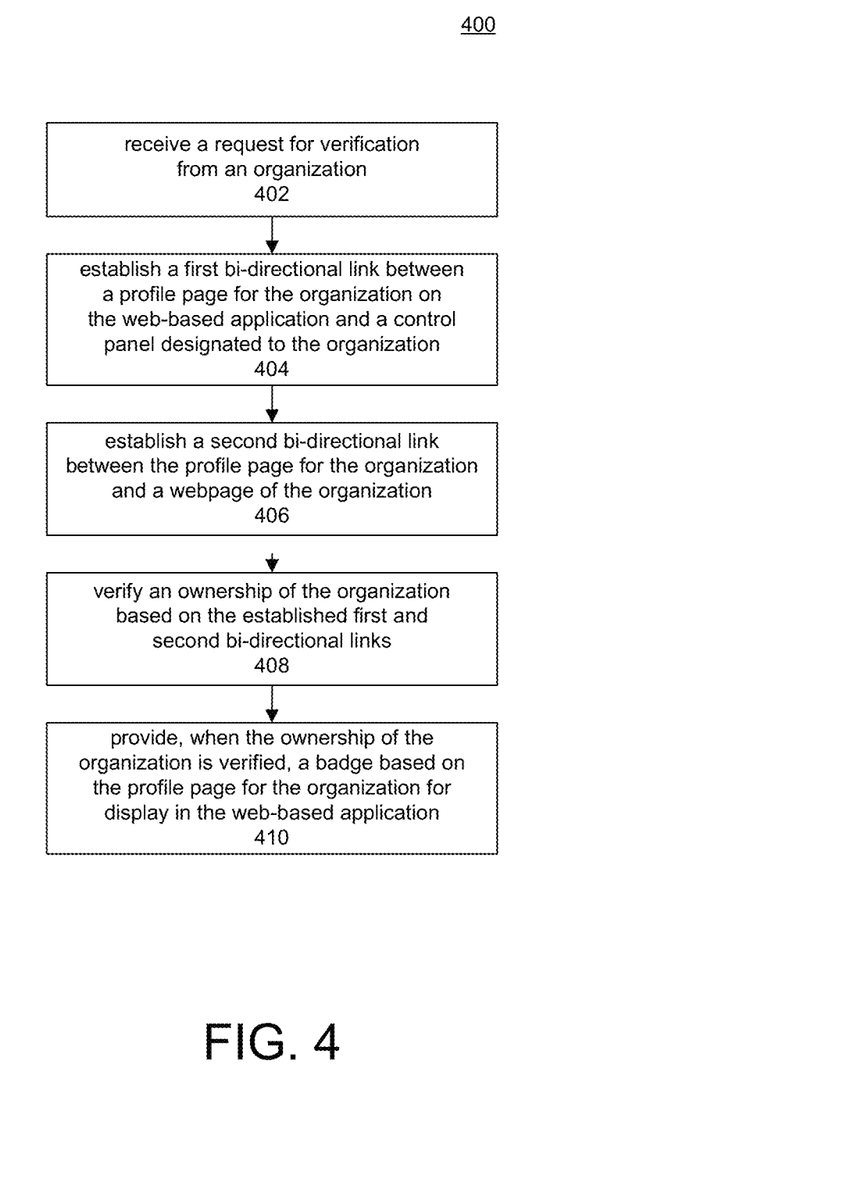
FIG. 4 illustrates an example method for verifying ownership of an organization on a web-based application.

FIG. 4 illustrates an example method for verifying ownership of an organization on a web-based application. A request for verification is received from an organization in block 402. The request may correspond to an organization creating an organization profile page on a web-based application (e.g., social networking application). The verification is used to establish that an organization is the actual owner of the organization profile page being created. In order to do so, a first bi-directional link between an organization profile page for the organization on the web-based application and a control panel designated to the organization is established in block 404. As described above, a link of the organization profile page may be placed into control panel. When the link from the organization profile page is provided to the control panel, a token is generated. The generated token may then be entered into the organization profile page to verify that organization profile page is connected to control panel. The verification is established when a proper token has been entered into the organization profile page. Otherwise, the connection may remain unverified.

In block 406, a second bi-directional link between the organization profile page and an organization webpage is established. A link to the organization's webpage may be established within the organization profile page by entering the uniform resource locator (URL) corresponding to the organization's webpage into the corresponding organization profile page. In some implementations, a code is provided to be placed onto the organization's webpage. The URL of the organization's webpage, which was previously provided, may be used to identify the location of a webpage from which the code is to be detected. Upon detecting that the code has been added to the organization webpage, the second bi-directional link may be established.

An ownership of the organization may then be verified, in block 408, based on the established first and second bi-directional links. The establishing of the first bi-directional link provides that the profile page for the organization is linked to the control panel designated to the organization. The establishing of the second bi-directional link provides that the profile page is linked to the organization's webpage. Having the organization profile page as a common link thus connects the control panel to the organization's webpage.

Once ownership of the organization webpage has been established, a badge for the organization is provided for display in the web-based application in block 410. The badge that is provided for display may be utilized in a variety of different ways, as discussed in further details below. The badge may be text based, or graphics based, or a combination of text and graphics. In some aspects, the badge may comprise information corresponding to the organization profile page. For example, text from the badge may include text that is found on the corresponding organization profile page.

In some implementations, the control panel may provide for administration of the badges via inputs by an authorized administrator. For example, the distribution and maintenance of the organizational badges may be performed through the control panel. Users who wish to obtain an organizational badge for their profile page may submit a request. The request may be approved or rejected through the control panel. When a request is approved, an organizational badge may be provided to the user's profile. Otherwise, the badge will not be accessible to the user. In some aspects, organizational badges may be rescinded, for example, when a user has been determined to have left the employ of the organization.

Figure 5:
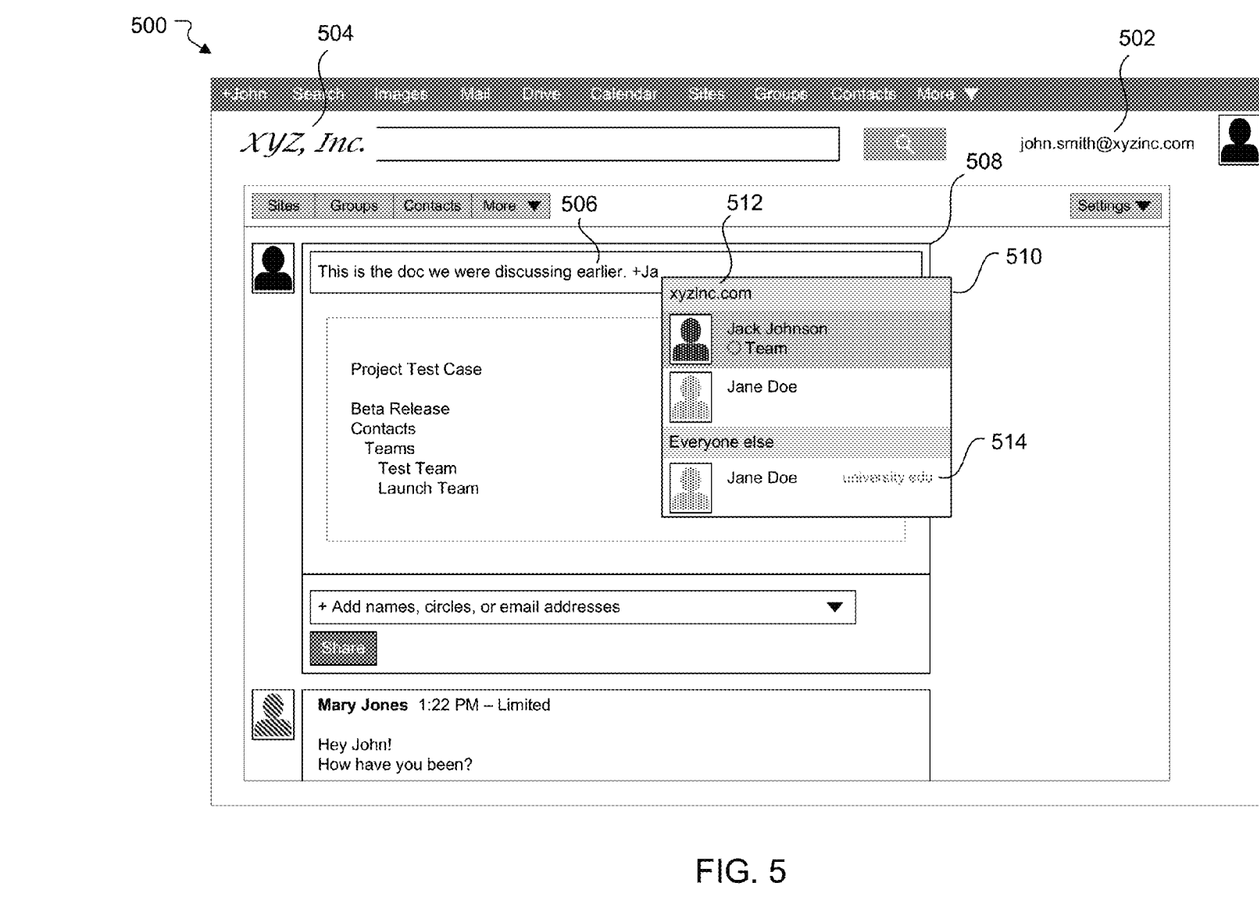
FIG. 5 provides a graphical representation of a social post feed that provides verified organizational tags.

FIG. 5 provides a graphical representation of a social post feed that provides verified organizational tags. Profile page 500, which corresponds to a user, John Smith, with email 502 (e.g., john.smith@xyzinc.com in this case), may include organizational badge 504. Organizational badge 504, as shown in this example, may also correspond to the domain of email 502. When another user inputs an entry 506 in social post feed 508 on the page, search suggest box 510 may appear and be populated to include a number of contacts of the user for which text in the entry matches. In this case, entry 506 includes "+Ja". As a result, all contacts of the user with "Ja" in the name are provided in search suggest box 510.

Search suggest box 510 may further include sections that correspond to an organization. For example, two search suggest results, Jack Johnson and Jane Doe, populate a section 512 that corresponds to xyzinc.com. The sections, as shown in this example, may be determined based on organizational badges associated with the search results. That is, Jack Johnson and Jane Doe may both be associated with XYZ, Inc., have organizational badges for XYZ, Inc., and thus be listed under section 512 which corresponds to xyzinc.com. Providing search suggest results in search suggest box 510 as described above enables the user to identify the appropriate party who the user would like to include in entry 506.

Figure 6:
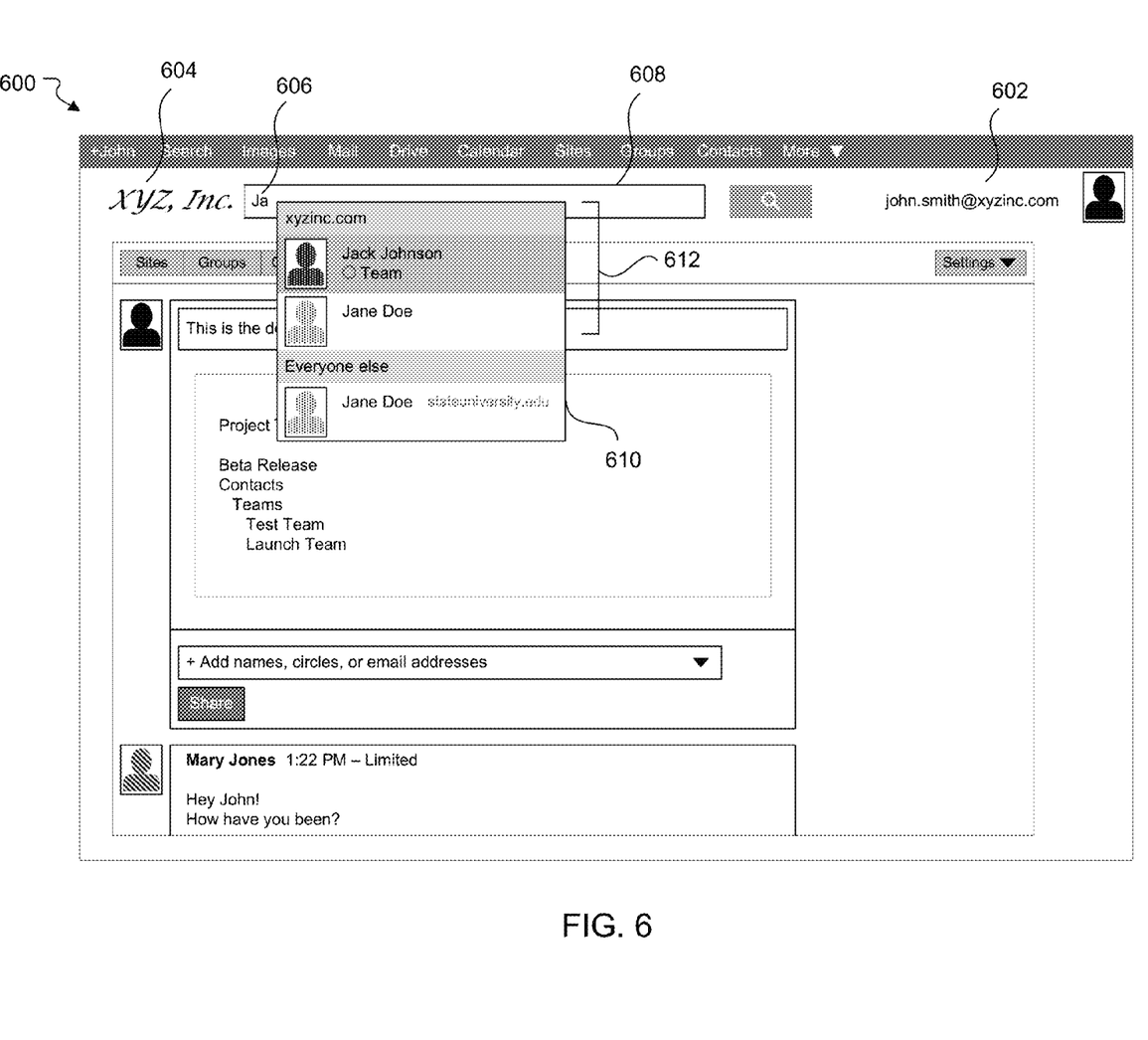
FIG. 6 provides a graphical representation of search results that provides verified organizational tags.

FIG. 6 provides a graphical representation of search results that provides verified organizational tags. Profile page 600 for user John Smith with email 602 may include organizational badge 604. Organizational badge 604 may correspond to the domain of email 602. When a user inputs a search query 606 into search box 608 on the page, search suggest box 610 may appear and be populated to include a number of suggested contacts for which text in the entry matches. In this case, search query 606 includes "Ja". As a result, certain suggested results with "Ja" in the text are provided in search suggest box 610. Search suggest box 610 may further include sections that correspond to an organization. In FIG. 6, Jack Johnson and Jane Doe populate section 612, which corresponds to xyzinc.com. The sections may be determined based on organizational badges associated with the search results. That is, Jack Johnson and Jane Doe may both be associated with XYZ, Inc., have organizational badges for XYZ, Inc., and have emails with the domain xyzinc.com. Thus, results corresponding to their names may be listed under section 612 which corresponds to xyzinc.com.

Figure 7:
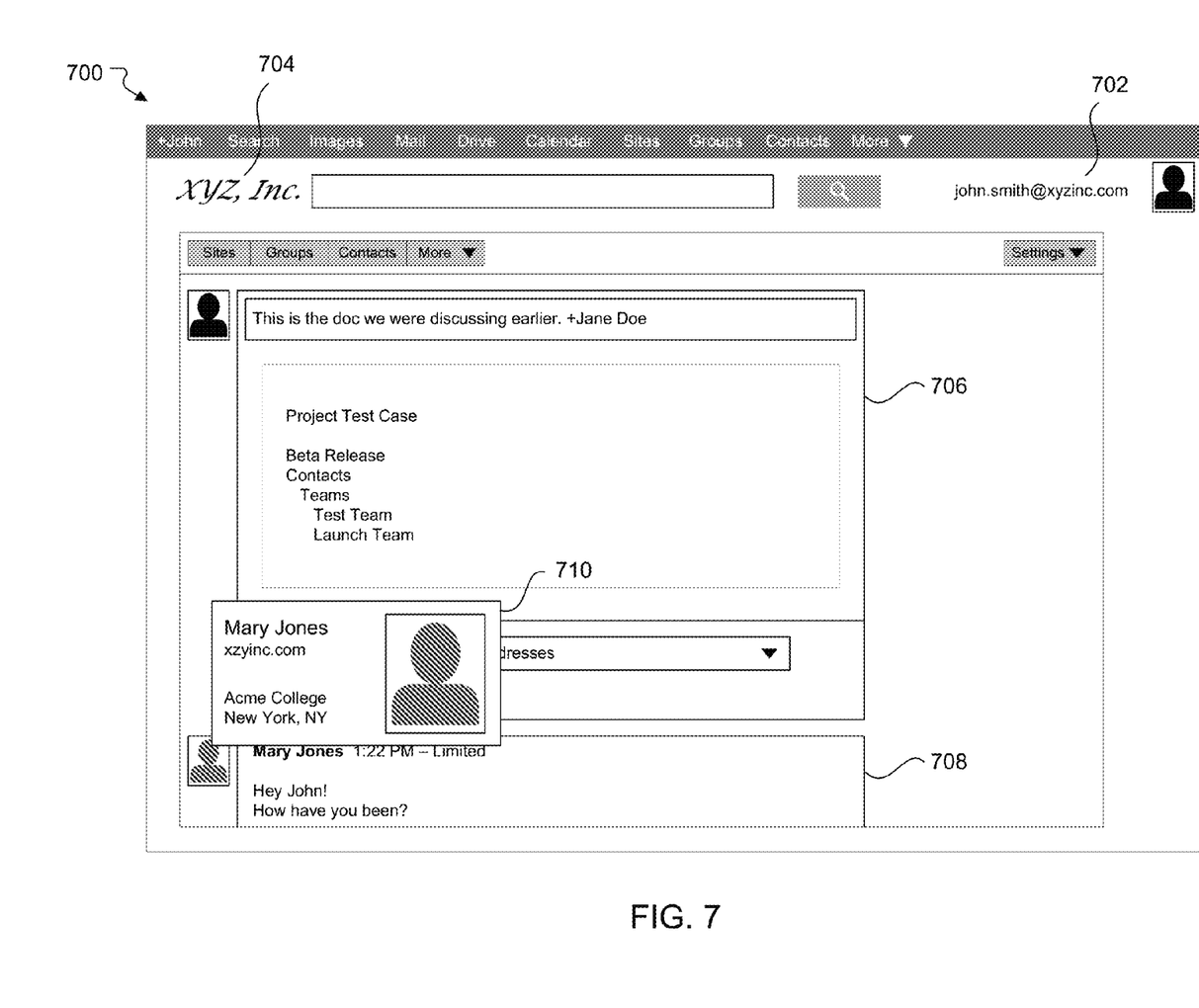
FIG. 7 provides a graphical representation of an information card related to a user profile that includes a verified organizational tag.

FIG. 7 provides a graphical representation of an information card related to a user profile that includes a verified organizational tag. Profile page 700 for user John Smith may include email 702 and organizational badge 704. Profile page 700 may further include post entries 706 and 708. In some implementations, when a cursor comes to rest over an area that corresponds to user information (e.g., a name of the user, an email of the user, an icon corresponding to the user, etc.), information card 710 (e.g., a hovercard) of the user may be presented. The information card may include a variety of information for the user, such as the name of the user, a location of the user, a profile picture of the user, schools which the user attended, etc. Additionally, the information card may include an organizational badge associated to the user that identifies a particular organization with which the user is associated.

In some implementations, a permissions control may be adjusted to change the visibility of the organizational badges. The permissions control may provide for different levels of visibility of the organizational badges. Access to the permissions control may be provided to an administrator via the control panel. Alternatively, the permissions control may be provided to the owner of the profile for which the permissions are to be adjusted. The different levels of visibility may include broadcasting to everyone, broadcasting to contacts specified by the user, broadcasting to users with a same organizational badge, etc. The different levels of visibility may also affect the media on which the organizational badge is provided. For example, the permissions control may limit whether or not the organizational badge is visible in a user's profile, on a user's information card, and in association with a user's name that is returned as a search result.

Figure 8:
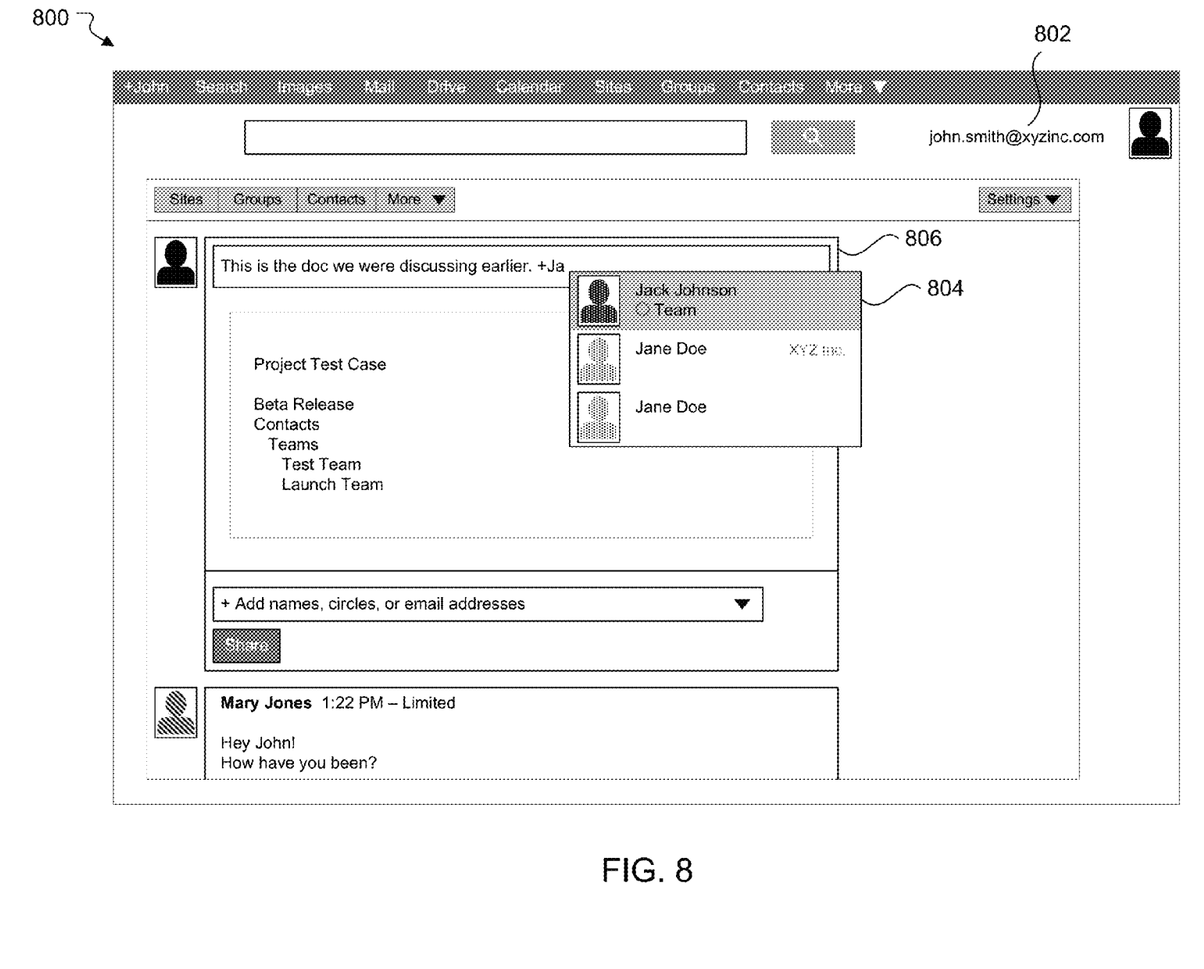
FIG. 8 provides a graphical representation of a social post feed that provides verified organizational tags.

FIG. 8 provides a graphical representation of a social post feed where the visibility of organizational tags is limited. For example, the profile for user 802 does not provide an organizational badge. Additionally, search suggest box 804 in social post feed 806 also does not provide categorization of the search results based on organizational badges. The absence of organizational badges in this example may be the result of a permissions control setting that causes an omission of the organizational badges.

In some aspects, the user may be provided with an opportunity to limit or remove the display of an organizational badge corresponding to the user's account. Additionally, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 9:
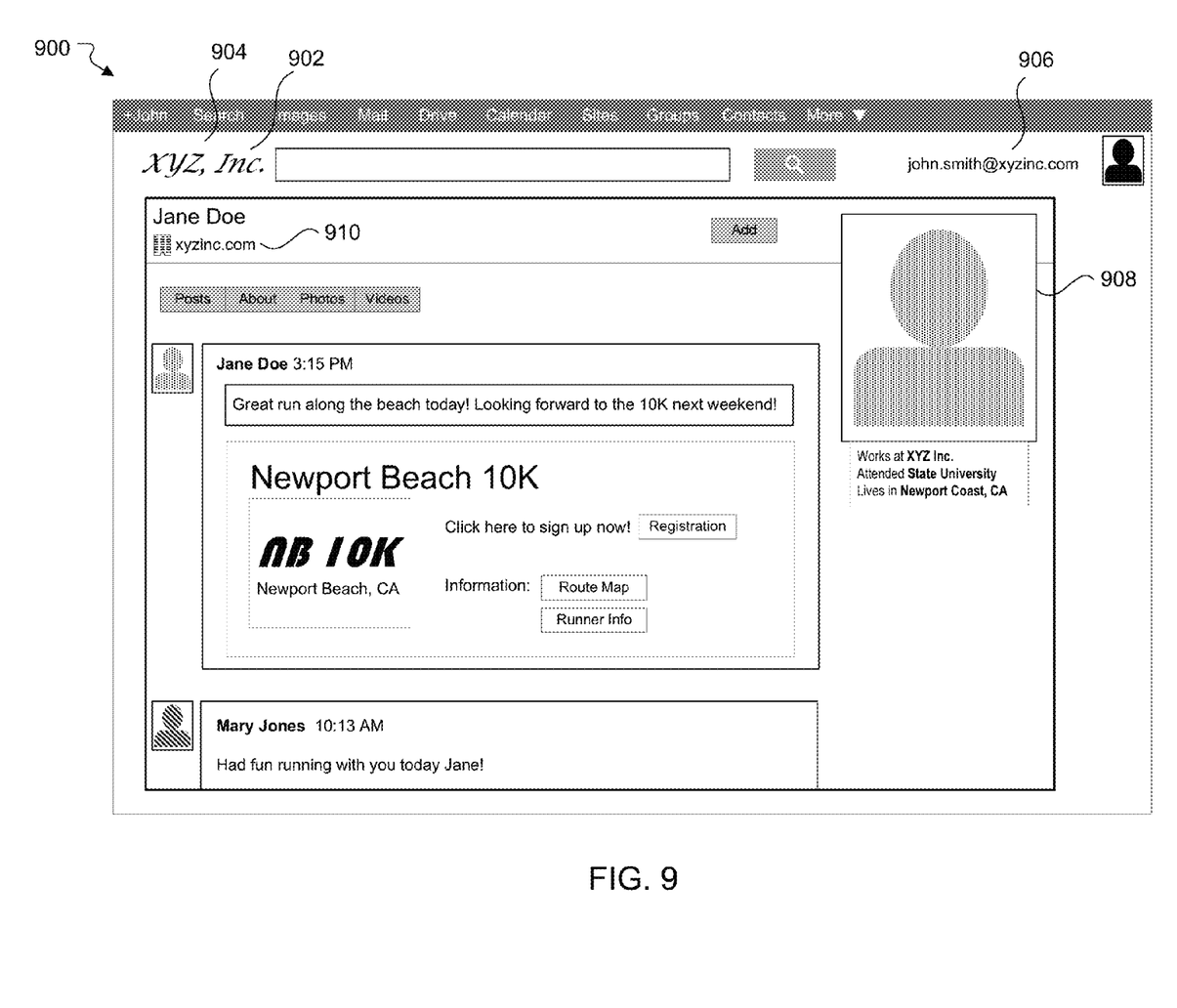
FIG. 9 provides a graphical representation of a user profile page on a social networking application that provides verified organizational tags.

FIG. 9 provides a graphical representation of a user profile page on a social networking application that provides verified organizational tags. Profile page 900 for user 902 (e.g., Jane Doe in this case) may include organizational badge 904, email address 906, and profile picture 908 associated with the user. Organizational badge 904, as shown in this example, may correspond to the domain of email 902 and company listing 910. In providing an easily identifiable indication of a user's association, organizational badge 904 allows a viewer of the profile page to determine whether or not he is on the profile page of the user he intended to view. For example, the viewer may have two contacts named Jane Doe, but only one of which is associated with XYZ, Inc. When the viewer navigates to profile page 900, the viewer may quickly ascertain that the Jane Doe corresponding to this particular profile page is in fact associated with XYZ, Inc., and therefore is the Jane Doe that the viewer is looking for.

Figure 10:
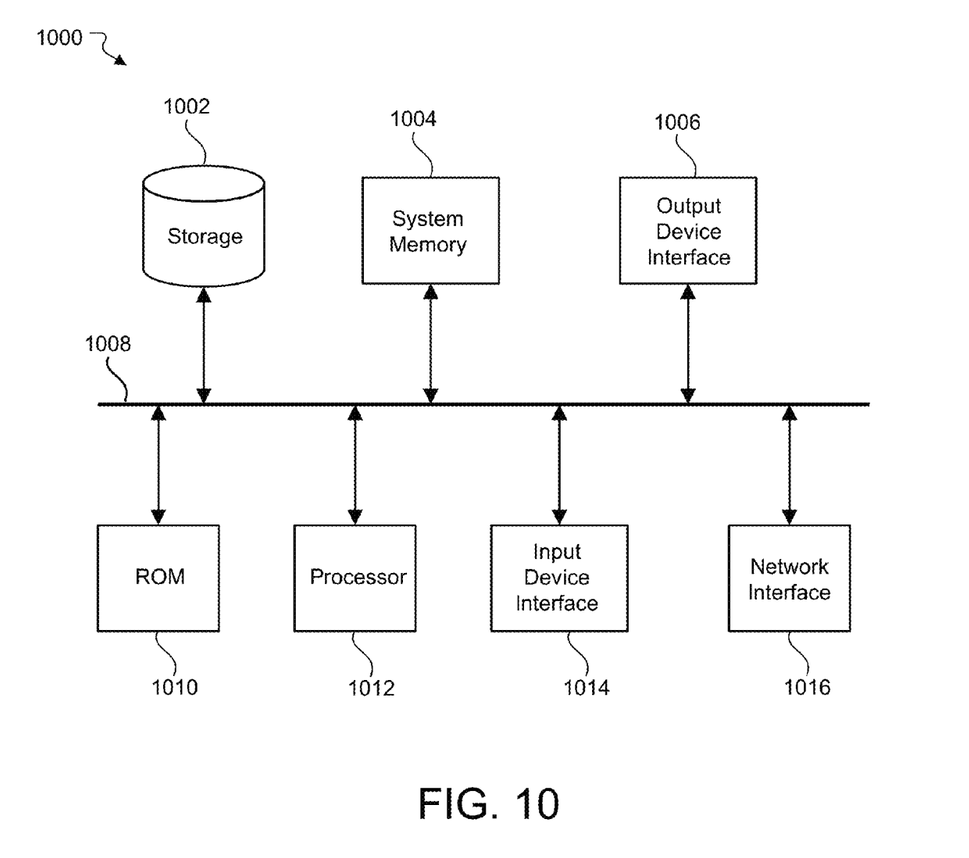
FIG. 10 conceptually illustrates an example electronic system with which some implementations of the subject technology are implemented.

FIG. 10 conceptually illustrates an example electronic system 1000 with which some implementations of the subject technology are implemented. Electronic system 1000 can be a computer, phone, PDA, or any other sort of electronic device. Such an electronic system includes various types of computer readable media and interfaces for various other types of computer readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for verifying ownership of an organization on a web-based application in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interface 1006 enables, for example, the display of images generated by the electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers, such as a local area network, a wide area network, or an Intranet, or a network of networks, such as the Internet. Any or all components of electronic system 1000 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as ASICs or FPGAs. In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method comprising:
   receiving, by a server associated with a web-based application, a request for ownership verification from an organization;
   providing, to a control panel designated to the organization, a link to a profile page for the organization on the web-based application to be entered into the control panel;
   receiving a token generated by the control panel based on the provided link;
   establishing a first bi-directional link between the profile page and the control panel by entering the received token into the profile page to authenticate the profile page;
   linking a webpage of the organization to the profile page;
   providing a first code to be placed onto the webpage of the organization;
   detecting a second code from the webpage of the organization;
   establishing, when the detected second code corresponds to the provided first code, a second bi-directional link between the profile page and the webpage;
   verifying, by the server, an ownership of the organization based on the established first and second bi-directional links by determining that the first bi-directional link between the profile page and the control panel and the second bi-directional link between the profile page and the webpage have been established; and
   providing, by the server, when the ownership of the organization is verified, a badge based on the profile page for the organization for display in the web-based application.

2. The computer-implemented method of claim 1, wherein the badge provided for display in the web-based application comprises information corresponding to the profile page of the organization.

3. The computer-implemented method of claim 2, wherein the information corresponding to the profile page of the organization includes a name of the organization.

4. The computer-implemented method of claim 1, wherein providing the badge for display in the web-based application further comprises providing the badge to members of the organization.

5. The computer-implemented method of claim 4, wherein the badge provided to the members of the organization is displayed in at least one of a profile page of a member, an information card corresponding to the member, and a search result that returns the member as a result.

6. The computer-implemented method of claim 1, further comprising providing controls for administering a distribution of the badge.

7. The computer-implemented method of claim 6, wherein administering the distribution of the badge comprises issuing the badge to identified members of the organization, updating information corresponding to the badge, and rescinding the badge from members determined to be no longer associated with the organization.

8. A machine-readable medium comprising instructions stored therein, which when executed by a system, cause the system to perform operations comprising:
receiving a request for ownership verification from an organization;
providing, to a control panel designated to the organization, a link to a profile page for the organization to be entered into the control panel;
receiving a token generated by the control panel based on the provided link;
establishing a first bi-directional link between the profile page and the control panel by entering the received token into the profile page to authenticate the profile page;
linking a webpage of the organization to the profile page;
providing a first code to be placed onto the webpage of the organization;
detecting a second code from the webpage of the organization;
establishing, when the detected second code corresponds to the provided first code, a second bi-directional link between the profile page and the webpage;
verifying an ownership of the organization based on the established first and second bi-directional links by determining that the first bi-directional link between the profile page and the control panel and the second bi-directional link between the profile page and the webpage have been established;
creating, when the ownership of the organization is verified, a badge for the organization, the badge including information corresponding to the profile page; and
providing the badge for display in a web-based application.

9. The machine-readable medium of claim 8, wherein the information corresponding to the profile page includes at least one of a name of the organization, a web address corresponding to the organization, or an icon associated to the organization.

10. The machine-readable medium of claim 8, wherein the instructions for providing the badge for display in the web-based application further comprises providing the badge to members of the organization.

11. The machine-readable medium of claim 10, wherein the badge provided to the members of the organization is displayed in at least one of a profile page of a member, an information card corresponding to the member, or a link to the member returned in a search result.

12. The machine-readable medium of claim 8, further comprising instructions for providing controls for administering a distribution of the badge, wherein administering the distribution of the badge comprises issuing the badge to identified members of the organization, updating information corresponding to the badge, and rescinding the badge from members determined to be no longer associated with the organization.

13. A system comprising:
one or more processors; and
a machine-readable medium comprising instructions stored therein, which when executed by the processors, cause the processors to perform operations comprising:
receiving a request for ownership verification from an organization;
providing, to a control panel designated to the organization, a link to a profile page for the organization on a web-based application to be entered into the control panel;
receiving a token generated by the control panel based on the provided link;
establishing a first bi-directional link between the profile page and the control panel by entering the received token into the profile page to authenticate the profile page;
linking a webpage of the organization to the profile page;
providing a first code to be placed onto the webpage of the organization;
detecting a second code from the webpage of the organization;
establishing, when the detected second code corresponds to the provided first code, a second bi-directional link between the profile page and the webpage;
verifying an ownership of the organization based on the established first and second bi- directional links by determining that the first bi-directional link between the profile page and the control panel and the second bi-directional link between the profile page and the webpage have been established;
creating, when the ownership of the organization is verified, a badge for the organization, the badge including information corresponding to the profile page;
identifying members of the organization; and
providing the badge for the organization for display on user profile pages of the identified members.

14. The system of claim 13, wherein the information corresponding to the profile page includes at least one of a name of the organization, a web address corresponding to the organization, or an icon associated to the organization.

* * * * *